(12) United States Patent
Lu et al.

(10) Patent No.: US 7,578,437 B2
(45) Date of Patent: Aug. 25, 2009

(54) DISPLAY-ENABLED ELECTRONIC SYSTEM

(75) Inventors: Chih-Chiang Lu, Hsin-Chu (TW); Jau-Min Ding, Taipei (TW); Yan-Rung Lin, Ping Tong County (TW); Yi-An Sha, Taipei (TW); Chi-Chang Liao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 601 days.

(21) Appl. No.: 11/250,981

(22) Filed: Oct. 13, 2005

(65) Prior Publication Data
US 2007/0000998 A1 Jan. 4, 2007

(30) Foreign Application Priority Data
Jul. 4, 2005 (TW) .............................. 94122542 A

(51) Int. Cl.
*G06K 5/00* (2006.01)
(52) U.S. Cl. ...................... 235/380; 235/375; 235/487; 235/494
(58) Field of Classification Search .................. 235/380, 235/375, 487, 494
See application file for complete search history.

(56) References Cited

U.S. PATENT DOCUMENTS

| 2002/0116330 A1 | 8/2002 | Hed et al. |
| 2004/0179718 A1 | 9/2004 | Chou |
| 2005/0029349 A1* | 2/2005 | McGregor et al. .......... 235/439 |

FOREIGN PATENT DOCUMENTS

| TW | 414704 | 12/2000 |
| TW | 505840 | 10/2002 |
| TW | 576084 | 2/2004 |

* cited by examiner

*Primary Examiner*—Karl D. Frech
(74) *Attorney, Agent, or Firm*—Quintero Law Office

(57) ABSTRACT

A display-enabled electronic system. The display-card electronic comprises an external device and card-type device receiving the external device. The external device provides a data signal. The card-type device comprises a card body, at least one image display unit, and an interface. The card body comprises a display surface and a receiving portion. The image display unit disposed in the display surface displays corresponding images in response to the data signal. The interface disposed in the receiving portion, electrically connects to the external device to transmit the data signal.

45 Claims, 7 Drawing Sheets

20

DISPLAY-ENABLED ELECTRONIC SYSTEM

BACKGROUND

The invention relates to display-enabled electronic systems, and more specifically to a card-type electronic system providing display function.

Wallet-sized card devices, such as credit cards, bank cards, and smart cards have become increasingly popular. Card devices, while conventionally equipped with only a single function, such as identification or payment, with improvements in technology, have begun to offer multiple functions. FIGS. 1A and 1B show a wireless communicating credit card 10 disclosed in U.S. PUB. APP. NO 20020116330, wherein FIG. 1A shows the front side of the wireless communicating credit card 10 and FIG. 1B is the back side and embedded circuit thereof. FIGS. 2A and 2B are schematic diagrams of a biometric identification card 20 disclosed in U.S. PUB. APP. NO 20040179718, wherein the FIG. 2A shows the front of the biometric identification card 20 comprising a fingerprint sensor 5 comparing detected fingerprint with stored data to identify the user. FIG. 2B shows the internal circuitry of the biometric identification card 20.

In the cards described, different functions include image display function showing personal identification profiles, such as the cardholder's name in a static display, and instant messages such as account balance and transaction records in a dynamic display. However, while requiring more functions, corresponding circuits, such as display panels, processor, data interfaces, driving circuits, and memory devices must be built in the card devices. Moreover, identification devices and firmware must also be embedded. The more functions implemented, the larger the card. However, dimensions of cards must meet standards such as the dimension of credit cards is about 85 mm*55 mm, whereas the flexibility of smart cards is also defined in ISO/IEC 10373. Thus, there are difficulties in card devices with multiple functions, the number of functions thereof being limited due to these requirements.

SUMMARY

Accordingly, a display-enabled electronic system is provided. An exemplary embodiment of a display-enabled electronic system comprises an external device, and a card-type device receiving the external device. The external device provides a data signal. The card-type device comprises a card body, at least one image display unit, and an interface. The card body comprises a display surface and a receiving portion. The image display unit disposed in the display surface displays corresponding images in response to the data signal. The interface disposed in the receiving portion, electrically connects to the external device to transmit the data signal.

Another display-enabled electronic system is also provided. The display-card electronic system comprises an external device, a connecting strip, and a card-type device receiving the external device. The external device provides a data signal. The card-type device comprises a card body, at least one image display unit, and an interface. The card body comprises a display surface and a receiving portion. The image display unit disposed in the display surface displays corresponding images in response to the data signal. The interface disposed in the receiving portion electrically connects to the external device to transmit the data signal. The connecting strip connects the external device with the interface in the mounted portion of the card-type device.

DESCRIPTION OF THE DRAWINGS

The invention will be described by way of exemplary embodiments, but not limitations, illustrated in the accompanying drawings in which like references denote similar elements, and in which.

DETAILED DESCRIPTION

Figure 1A:
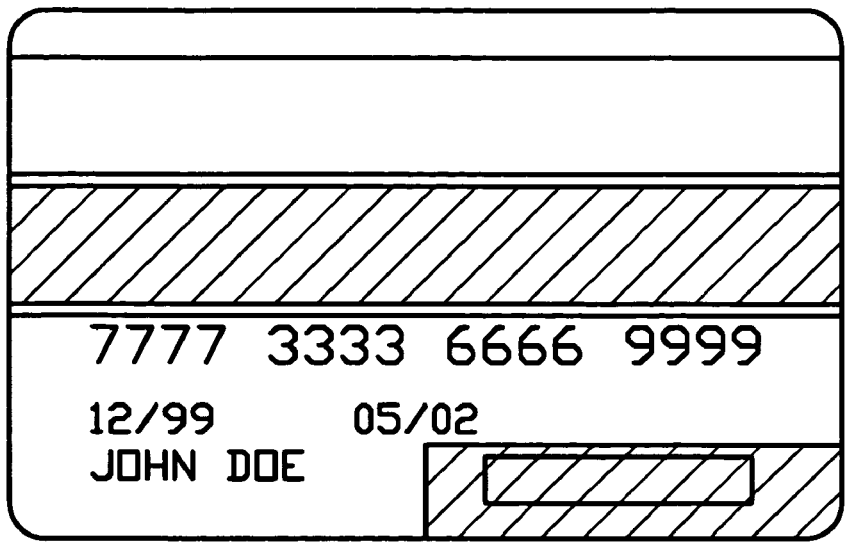
FIG. 1A is a schematic diagram of the front of a conventional wireless communicating credit card.
Figure 1B:
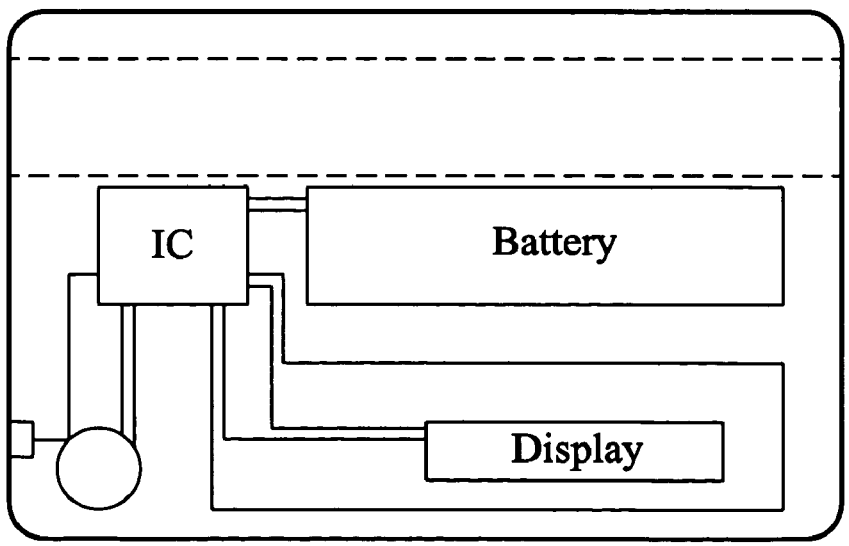
FIG. 1B is a schematic diagram of the back of the conventional wireless communicating credit card.
Figure 2A:
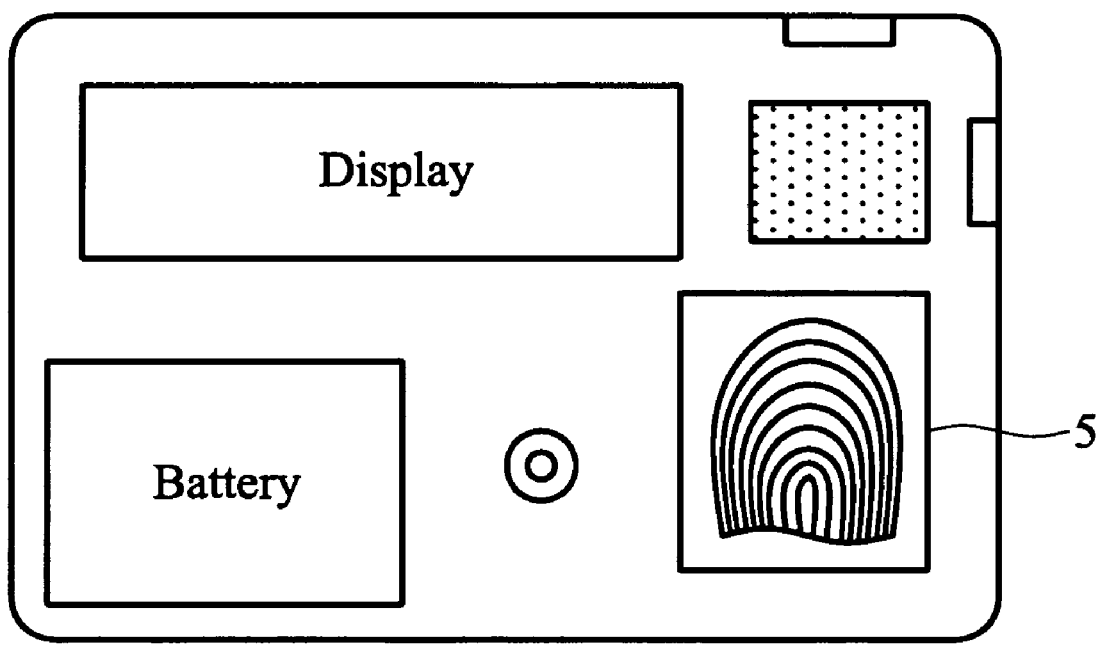
FIG. 2A is a schematic diagram of a conventional biometric recognition card.
Figure 2B:
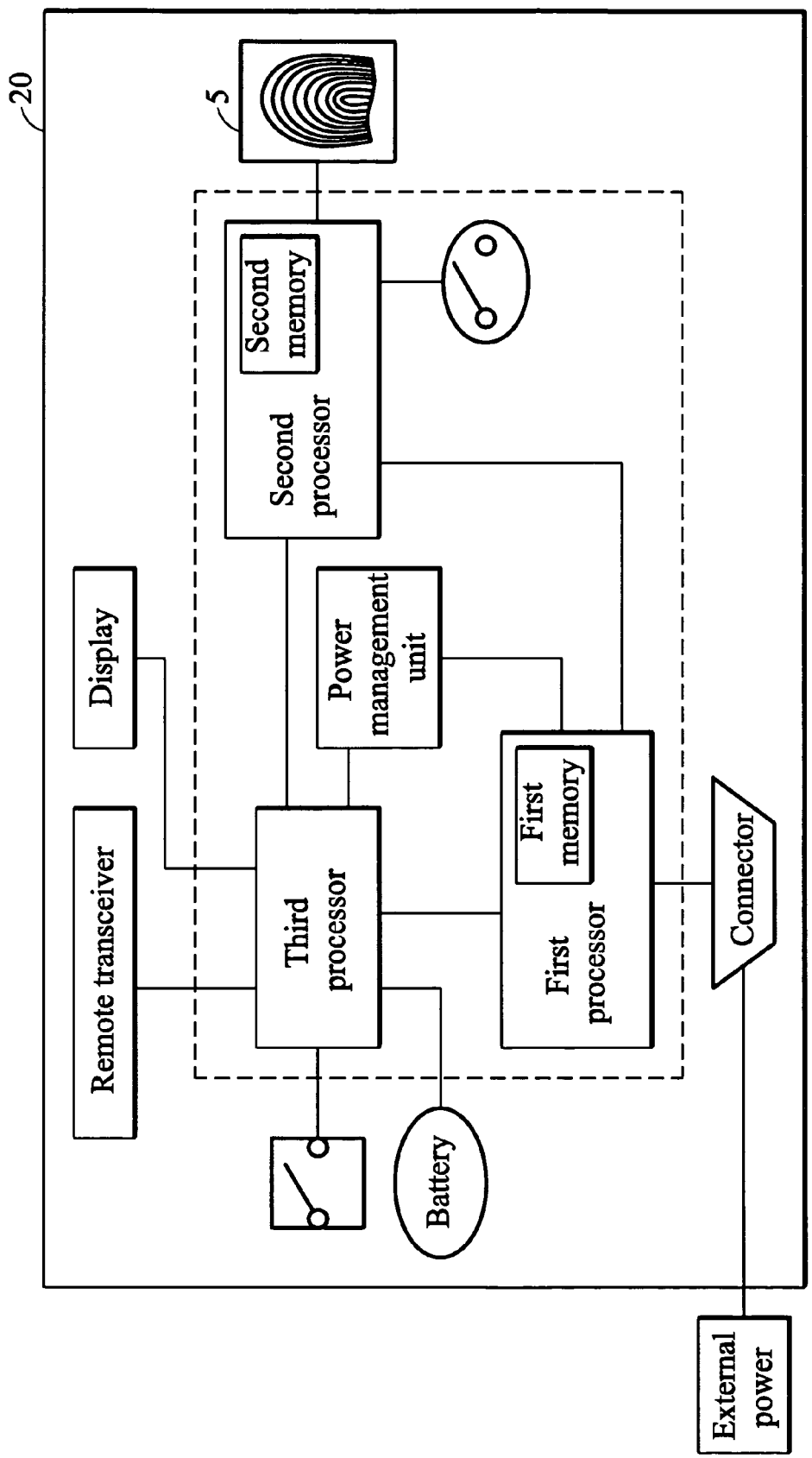
FIG. 2B is a schematic diagram of the internal circuit of the conventional biometric recognition card of FIG. 2A.
Figure 3:
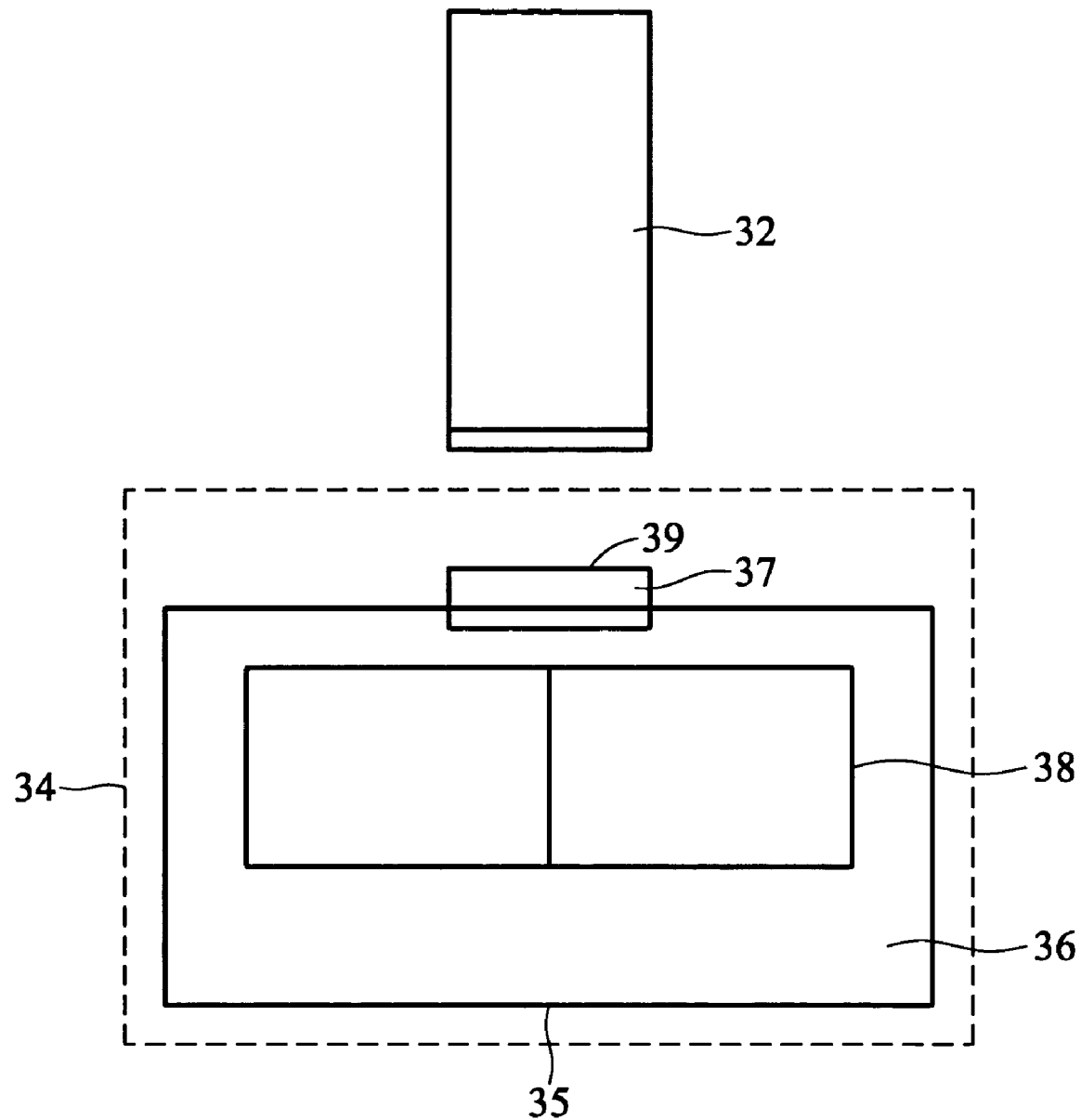
FIG. 3 is a schematic diagram of a display-enabled electronic system of an embodiment of the invention.

FIG. 3 is a schematic diagram of a display-enabled electronic system of an embodiment of the invention. The display-enabled electronic system 30 comprises an external device 32 and a card-type device 34. The external device provides a data signal to the card-type device 34. The card-type device 34 comprises a card body 35, at least one image display unit 38, and an interface 39. The card body 35 comprises a display surface 36 and a receiving portion 37, wherein card body 35 may be configured to conform to the dimensions (85 mm*55 mm) of conventional credit cards. The image display unit 38 is disposed in the display surface 36, and the interface 39 is disposed in the mounted portion 37. When the external device 32 enters the receiving portion 37, being electrically connected to the card-type device 34 via the interface 39, the external device 32 transmits the data signal via the interface 39, and the image display unit 38 then displays corresponding images in accordance with received data signal. The interface 39 may be designed according to desired functions, or adopt standard interfaces, such as PCMCIA, USB, or RS-232.

Figure 4A:
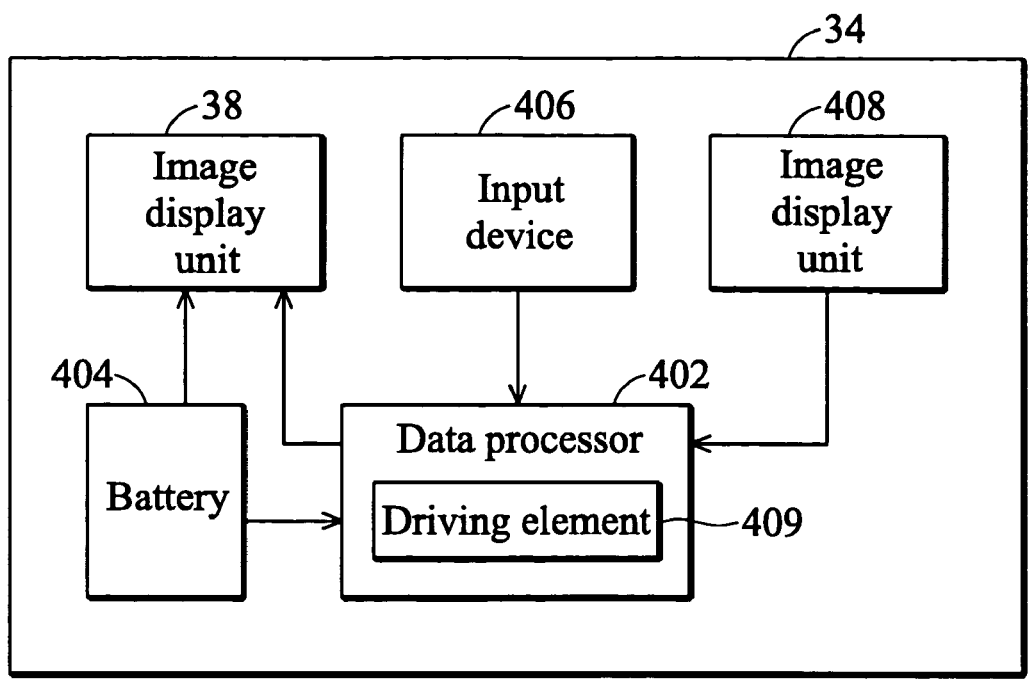
FIG. 4A is an exemplary embodiment of the internal circuitry of a card-type device.

FIG. 4A shows an exemplary embodiment of the internal circuitry of the card-type device 34. As shown, the card-type device 34 comprises a data processor 402, a battery 404, an input device 406, the image display unit 38, and an image display unit 408. The data processor 402 receives a data signal from the external device 32 and transforms the data signal into an image signal displayed by the image display unit 38. In addition, the data processor 402 comprises a driving element 409 to output the image signal to the image display unit 38. The battery 404 provides power to the card-type device 34, including the power needed for image display unit 38 to display images. Thus, even when the card-type device 34 is not electrically connected to the external device 32, image display is still enabled. The input device 406, such as a magnetic stripe, keyboard, biometric identification device (for example, fingerprint sensor), receives input data. The input device 406 may also be a tablet, receiving stylus or other input. The image display unit 408 captures images and transmits the captured images to the data processor 402 for storage and processing, allowing the image display unit 38 to display images, wherein the image display unit 408 may be a Charge Coupled Device (CCD) camera.

Figure 4B:
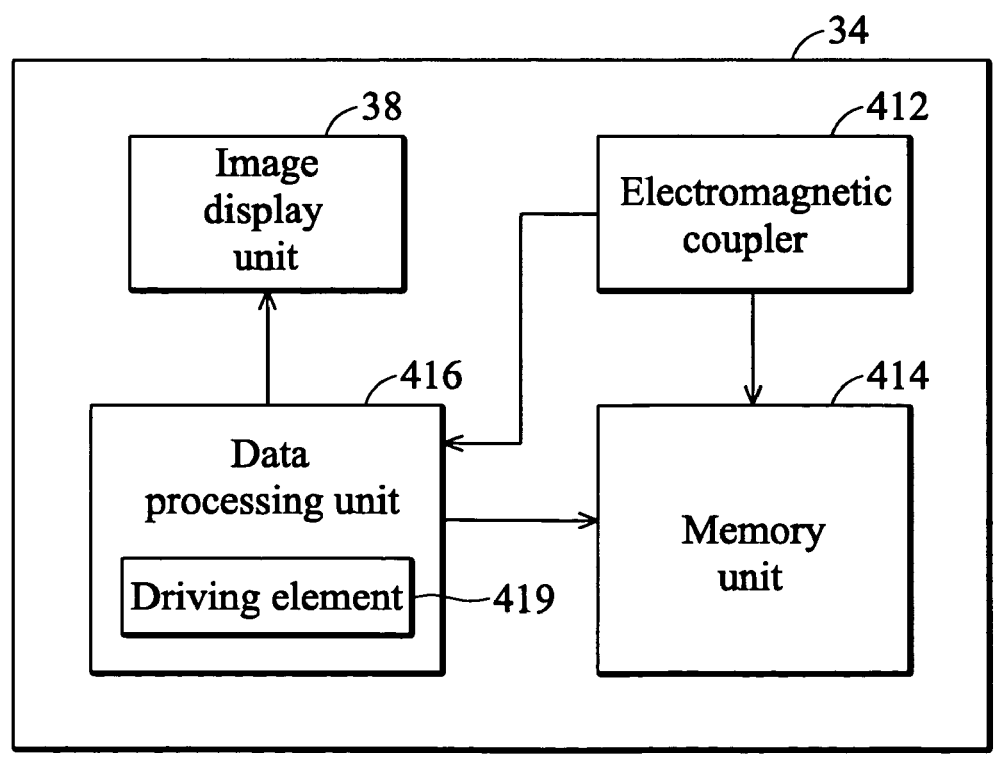
FIG. 4B is another exemplary embodiment of the internal circuitry of a card-type device.

FIG. 4B shows another exemplary embodiment of the internal circuitry of the card-type device 34. The card-type device 34 further comprises an electromagnetic coupler 412, at least one memory unit 414, and a data processing unit 416. The electromagnetic coupler 412, such as a coil or an antenna, receives or transmits electromagnetic signals, and data contained therein. The memory unit 414, such as a random access memory (RAM) or a read-only memory (ROM), stores the transmitted data, and internal execution codes. The data processing unit 416 encodes or decodes the data, and performs calculations. The data processing unit 416 also writes the data to the memory unit 414 or reads data therefrom. In addition, the data processing unit 416 comprises a driving element 419 and may transform the data into an image signal to the image display unit 38 via the driving element 419. The combination of the electromagnetic coupler 412, memory unit 414, and data processing unit 416 constitutes the radio frequency identification (RFID) function of the card-type device 34, such that when the card-type device 34 is in a RFID field, it is capable of receiving instant messages, and directly displaying received messages on the image display unit 38. It, however, should be noted that the card-type device of the invention can combine circuitries shown in FIGS. 4A and 4B, and others, in accordance with desired function.

Figure 5A:
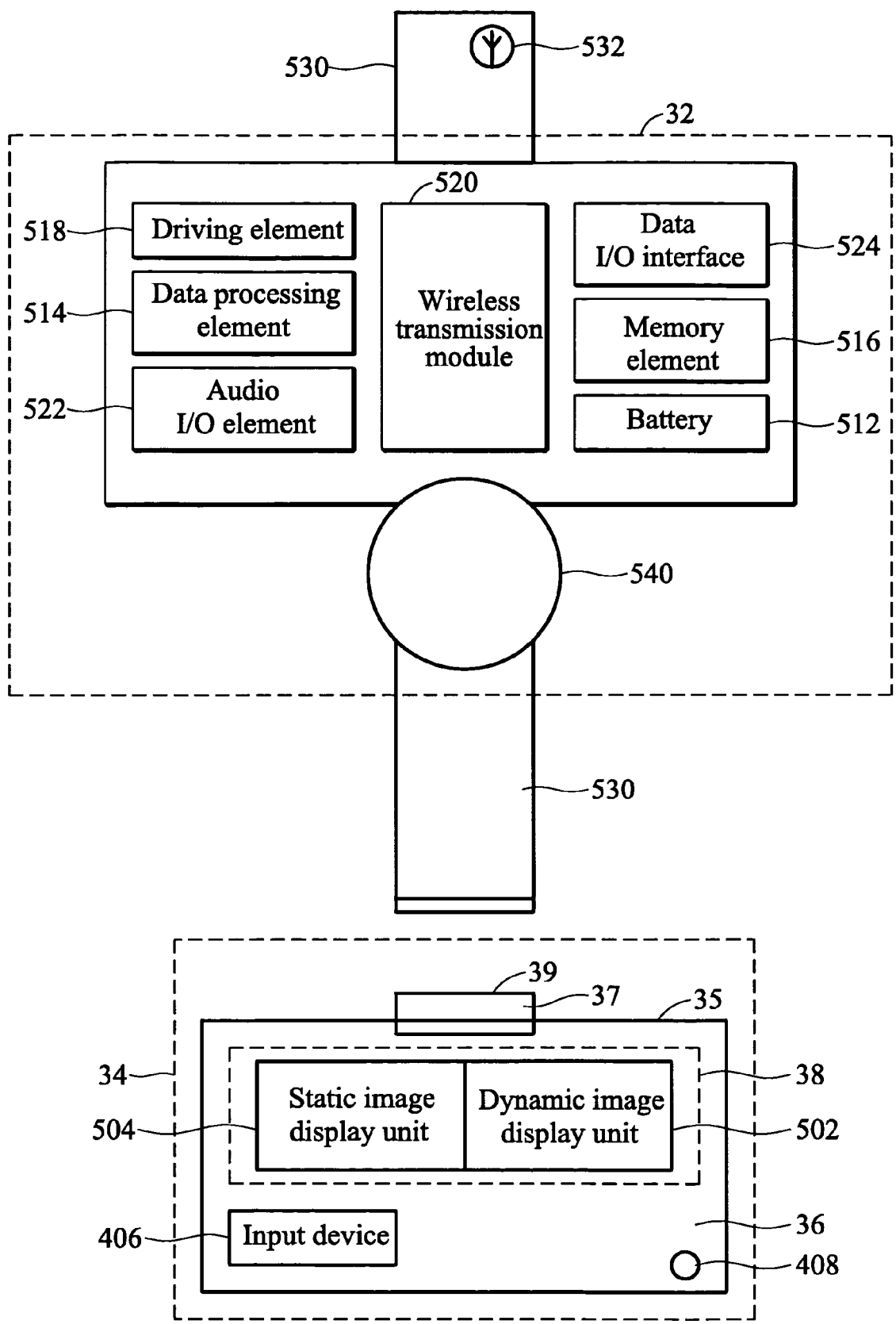
FIG. 5A is a schematic diagram of a display-enabled electronic system of an embodiment of the invention.

FIG. 5A is a schematic diagram illustrating an embodiment of a display-enabled electronic system 500, showing detailed internal structure of the display-enabled electronic system 30 of FIG. 3, using reference numerals as those in FIG. 3, not described in further detail. FIG. 5A shows the front of the card-type device 34, wherein the image display unit 38 comprises a dynamic image display unit 502, and a static image display unit 504. The dynamic image display unit 502, such as cholesteric liquid-crystal display (Ch-LCD), elecctrophoretic display (EPD), or organic light emitting display (OLED), may be a liquid crystal display panel (LCD panel), or non-LCD panel. The dynamic image display unit 502 updates displayed images in accordance with the image signal transmitted by the data processor 402. The static image display unit 504 displays still images, such as the name and photo of the cardholder, card number, and valid date. The external device 32 comprises a battery 512, a data processing element 514, a memory element 516, a driving element 518, a wireless transmission module 520, an audio I/O element 522, and a data I/O interface 524. The battery 512 is a rechargeable battery or non-rechargeable battery, and may be a Li-ion battery, NiZn battery, fuel battery, or others. The battery 512 provides power to the display-enabled electronic system 500, including the power needed when the dynamic image display unit displays images. The data processing element 514 is operative for signal processing, including signal processing of the electronic components of the external device, and when the external device 32 is electrically connected to the card-type device 34 via the interface 39, the data processing element 514 transmits processed signal to the card-type device 34, allowing the image display unit 38 to display corresponding images. The wireless transmission module 520 for wireless transmission includes a wireless receiver, or a wireless transmitter and other related circuits. The image capture element 408 captures images, and transmits captured images to the wireless transmission module 520, allowing the wireless transmission module 520 to transmit images wirelessly. The audio I/O element 522, such as a microphone or a speaker, receives or outputs audio signals. The data I/O interface may be a Universal Serial Bus (USB), enabling the external device 32 to connect to a memory device to expand memory capacity of the external device 32, or to read or write program codes.

Figure 5B:
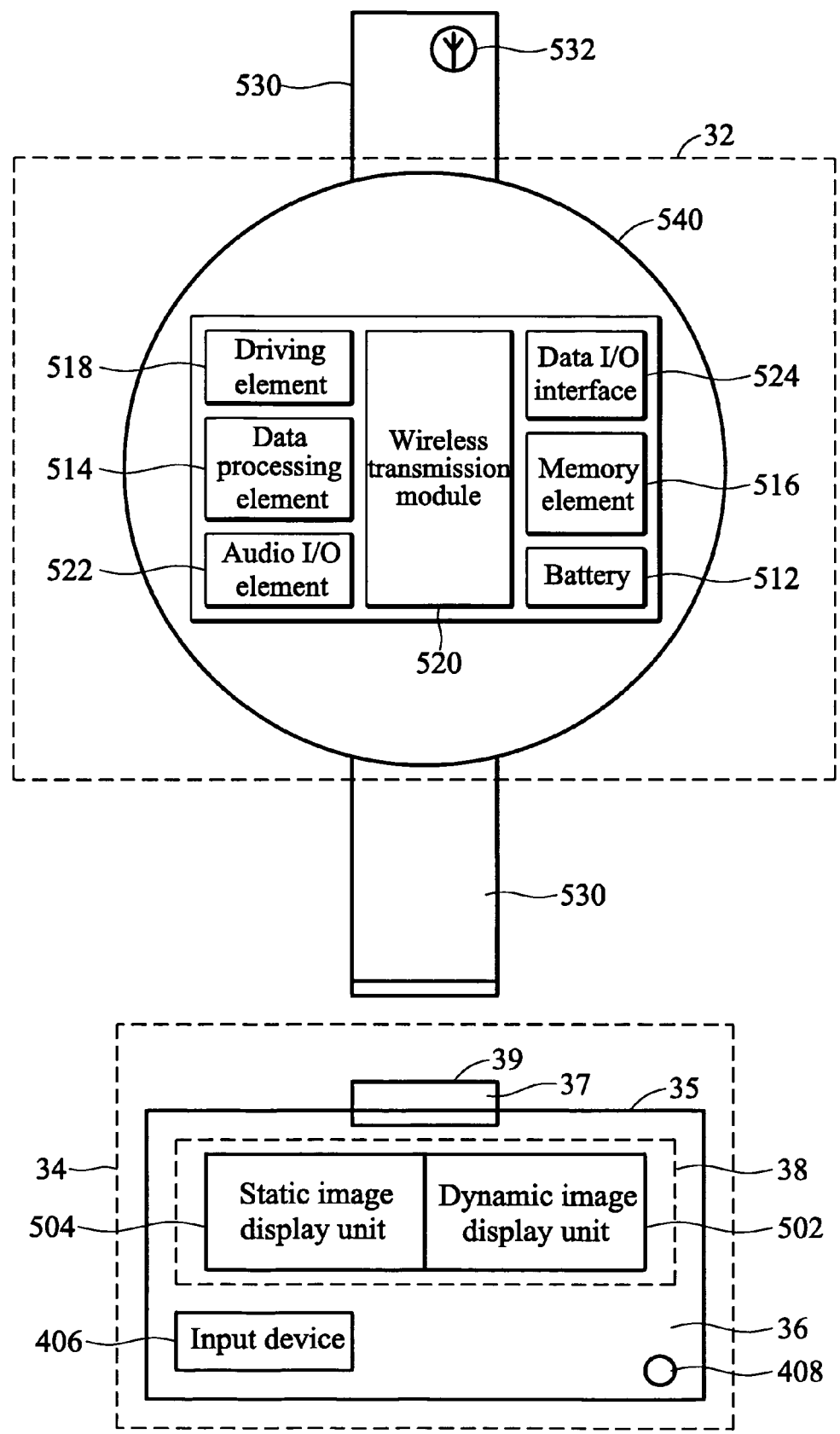
FIG. 5B is a schematic of a display-enabled electronic system of another embodiment of the invention.

The display-enabled electronic system 500 further comprises a connecting strip 530 connecting the external device 32 with the interface 39 in the mounted portion 37 of the card-type device 34. The connecting strip 530 comprises an antenna 532 coupled to the external device, receiving a wireless signal, and transmitting the wireless signal to the external device 32, or receiving the wireless signal from the external device 32 and transmitting the wireless signal. The display-enabled electronic system 500 further comprises a reel 540 winding the connecting strip 530, providing ease of management for the strip 530. Thus, the display-enabled electronic system 500 connected by the connecting strip 530 and reel 540 is easily transported and separated for use. FIG. 5B shows another exemplary embodiment of a display-enabled electronic system 550, similar to the display-enabled electronic system 500 of FIG. 5A, except that electronic elements of the external device 32 of FIG. 5B are disposed on the reel 540.

Moreover, it should be appreciated by those skilled in the art that adjustment of electronic components of the external device and the card-type device in accordance with desired functions is applicable within the disclosure.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display-enabled electronic system comprising:
   an external device, providing a data signal; and
   a card-type device receiving the external device, and comprising:
   a card body comprising a display surface and a receiving portion;
   at least one image display unit disposed in the display surface, displaying corresponding images in response to the data signal;
   an image capture unit capturing images; and
   an interface disposed in the receiving portion, electrically connecting to the external device to transmit the data signal.

2. The display-enabled electronic system of claim 1, wherein the card-type device further comprises a data processor receiving and converting the data signal to an image signal displayed by the image display unit.

3. The display-enabled electronic system of claim 2, wherein the data processor comprises a driving element to output the image signal to the image display unit.

4. The display-enabled electronic system of claim 1, wherein the image display unit comprises a dynamic image display unit and a static image display unit, with images displayed by the dynamic image display unit updated by the image signal in response to the data signal.

5. The display-enabled electronic system of claim 1, wherein the card-type device further comprises:
   an electromagnetic coupler receiving and transmitting an electromagnetic signal and the data thereof;
   at least one memory unit storing the data; and
   a data processing unit processing the data and converting the data into an image signal to the image display unit.

6. The display-enabled electronic system of claim 5, wherein the data processing unit comprises a driving element to output the image signal to the image display unit.

7. The display-enabled electronic system of claim 1, wherein the card-type device further comprises a battery providing power to the image display unit when displaying images.

8. The display-enabled electronic system of claim 1, wherein the card-type device further comprises an input device to receive input data.

9. The display-enabled electronic system of claim 8, wherein the input device is a magnetic strip.

10. The display-enabled electronic system of claim 8, wherein the input device is a biometric identification device.

11. The display-enabled electronic system of claim 8, wherein the input device is a tablet receiving handwriting characters and lines.

12. The display-enabled electronic system of claim 8, wherein the input device is a keyboard.

13. The display-enabled electronic system of claim 1, wherein the image capture unit is a Charge Coupled Device (CCD) camera.

14. The display-enabled electronic system of claim 1, wherein the external device comprises a battery providing power to the display-enabled electronic system.

15. The display-enabled electronic system of claim 1, wherein the external device comprises a data processing element processing signals.

16. The display-enabled electronic system of claim 1, wherein the external device comprises a memory element storing data.

17. The display-enabled electronic system of claim 1, wherein the external device comprises a driving element driving the image display unit.

18. The display-enabled electronic system of claim 1, wherein the external device comprises a wireless transmission module.

19. The display-enabled electronic system of claim 18, wherein the image capture unit is operable to transmit the captured images to the wireless transmission module, allowing the wireless transmission module to transmit the images.

20. The display-enabled electronic system of claim 1, wherein the external device comprises an audio I/O (input/output) element receiving and outputting audio signals.

21. The display-enabled electronic system of claim 1, further comprising a connecting strip connecting the external device with the interface in the mounted portion of the card-type device.

22. The display-enabled electronic system of claim 21, wherein the connecting strip comprises an antenna coupled to the external device, transmitting and receiving wireless signals.

23. The display-enabled electronic system of claim 21, wherein the external device comprises a reel winding the connecting strip.

24. The display-enabled electronic system of claim 1, wherein the external device comprises a data I/O interface.

25. The display-enabled electronic system of claim 24, wherein data I/O interface is a Universal Serial Bus (USB).

26. The display-enabled electronic system of claim 24, wherein the external device connects to memory via the data I/O interface.

27. A display-enabled electronic system comprising:
an external device, providing a data signal;
a card-type device receiving the external device, and comprising:
a card body comprising a display surface and a receiving portion;
at least one image display unit disposed in the display surface, displaying corresponding images in response to the data signal; and
an interface disposed in the receiving portion, electrically connecting the external device to transmit the data signal; and
a connecting strip connecting to the external device with the interface in the mounted portion of the card-type device.

28. The display-enabled electronic system of claim 27, wherein the card-type device further comprises a data processor receiving and converting the data signal to an image signal displayed by the image display unit.

29. The display-enabled electronic system of claim 28, wherein the data processor comprises a driving element to output the image signal to the image display unit.

30. The display-enabled electronic system of claim 27, wherein the card-type device further comprises:
an electromagnetic coupler receiving and transmitting an electromagnetic signal and the data thereof;
at least one memory unit storing the data; and
a data processing unit processing the data and converting the data into an image signal to the image display unit.

31. The display-enabled electronic system of claim 30, wherein the data processing unit comprises a driving element to output the image signal to the image display unit.

32. The display-enabled electronic system of claim 27, wherein the card-type device further comprises a battery providing power to the image display unit when displaying images.

33. The display-enabled electronic system of claim 27, wherein the card-type device further comprises an input device receiving input data.

34. The display-enabled electronic system of claim 27, wherein the card-type device further comprises an image capture unit capturing images.

35. The display-enabled electronic system of claim 27, wherein the external device comprises a battery providing power to the display-enabled electronic system.

36. The display-enabled electronic system of claim 27, wherein the external device comprises a data processing element processing signals.

37. The display-enabled electronic system of claim 27, wherein the external device comprises a memory element storing data.

38. The display-enabled electronic system of claim 27, wherein the external device comprises a driving element driving the image display unit.

39. The display-enabled electronic system of claim 27, wherein the external device comprises a wireless transmission module.

40. The display-enabled electronic system of claim 39, wherein the card-type device further comprises an image capture element capturing images, and transmitting the captured images to the wireless transmission module, allowing the wireless transmission module to transmit the images.

41. The display-enabled electronic system of claim 27, wherein the external device comprises an audio I/O (input/output) element receiving and outputting audio signals.

42. The display-enabled electronic system of claim 27, wherein the connecting strip comprises an antenna coupled to the external device, transmitting and receiving wireless signals.

43. The display-enabled electronic system of claim 27, wherein the external device comprises a reel winding the connecting strip.

44. The display-enabled electronic system of claim 27, wherein the external device comprises a data I/O interface.

45. The display-enabled electronic system of claim 27, wherein the connecting strip is separable from the card type device.

* * * * *

UNITED STATES PATENT AND TRADEMARK OFFICE
CERTIFICATE OF CORRECTION

PATENT NO. : 7,578,437 B2 Page 1 of 1
APPLICATION NO. : 11/250981
DATED : August 25, 2009
INVENTOR(S) : Lu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Seventh Day of September, 2010

David J. Kappos
*Director of the United States Patent and Trademark Office*